(12) United States Patent
Yasuda

(10) Patent No.: US 10,076,877 B2
(45) Date of Patent: Sep. 18, 2018

(54) FORMING APPARATUS

(71) Applicant: FUJI XEROX CO., LTD., Tokyo (JP)

(72) Inventor: Shin Yasuda, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 134 days.

(21) Appl. No.: 14/879,571

(22) Filed: Oct. 9, 2015

(65) Prior Publication Data

US 2016/0361870 A1 Dec. 15, 2016

(30) Foreign Application Priority Data

Jun. 12, 2015 (JP) ................................ 2015-119430

(51) Int. Cl.
*B29C 67/00* (2017.01)
*B33Y 30/00* (2015.01)

(52) U.S. Cl.
CPC ...... *B29C 67/0059* (2013.01); *B29C 67/0085* (2013.01); *B33Y 30/00* (2014.12)

(58) Field of Classification Search
CPC . B29C 67/0059; B29C 66/71; B29C 67/0088; B29C 67/007; B29C 67/0085; B33Y 30/00
See application file for complete search history.

(56) References Cited

U.S. PATENT DOCUMENTS

| 5,042,921 | A | * | 8/1991 | Sato | ..................... H04N 9/3167 |
| | | | | | 348/E9.027 |
| 5,706,066 | A | * | 1/1998 | Sawayama | .............. G02F 1/315 |
| | | | | | 349/113 |
| 6,480,330 | B1 | * | 11/2002 | McClay | ................... G02B 1/02 |
| | | | | | 359/359 |
| 6,552,760 | B1 | * | 4/2003 | Gotoh | .................... H04N 9/315 |
| | | | | | 348/E9.027 |
| 2004/0252369 | A1 | * | 12/2004 | Wilklow | .............. G02B 5/3041 |
| | | | | | 359/359 |
| 2008/0239044 | A1 | | 10/2008 | Yokota | |
| 2009/0059198 | A1 | * | 3/2009 | Shibazaki | ........... G03F 7/70775 |
| | | | | | 355/72 |
| 2013/0234370 | A1 | * | 9/2013 | Suzuki | ............... B29C 67/0059 |
| | | | | | 264/401 |

(Continued)

FOREIGN PATENT DOCUMENTS

JP 2006-159852 A 6/2006
JP 2008-265329 A 11/2008

*Primary Examiner* — Joseph S Del Sole
*Assistant Examiner* — Cedrick S Williams
(74) *Attorney, Agent, or Firm* — Sughrue Mion, PLLC

(57) ABSTRACT

Provided is a forming apparatus including an ejection unit that has an ejection surface from which a droplet of a light curing forming liquid is ejected toward a base surface of a forming base plate and that moves relatively to the forming base plate, an irradiation unit that irradiates the forming liquid ejected on the forming base plate with an irradiation beam to cure the forming liquid and that is provided such that an incident plane defined by an optical axis of the irradiation beam and the base surface intersects with the ejection surface, and a P-polarizing unit that is provided in the irradiation unit and that adjusts the irradiation beam to match P-polarized beam parallel to the incident plane.

13 Claims, 11 Drawing Sheets

(56) References Cited

U.S. PATENT DOCUMENTS

| | | | | |
|---|---|---|---|---|
| 2015/0124194 A1* | 5/2015 | Oya | ................... | G02B 5/3083 349/61 |
| 2015/0140230 A1* | 5/2015 | Jones | ................... | B23P 23/04 427/532 |
| 2015/0174824 A1* | 6/2015 | Gifford | ............... | B29C 67/0085 425/183 |

* cited by examiner

FORMING APPARATUS

CROSS-REFERENCE TO RELATED APPLICATIONS

This application is based on and claims priority under 35 USC 119 from Japanese Patent Application No. 2015-119430 filed Jun. 12, 2015.

BACKGROUND

Technical Field

The present invention relates to a forming apparatus.

SUMMARY

According to an aspect of the invention, there is provided a forming apparatus including:

an ejection unit that has an ejection surface from which a droplet of a light curing forming liquid is ejected toward abase surface of a forming base plate and that moves relatively to the forming base plate;

an irradiation unit that irradiates the forming liquid ejected on the forming base plate with an irradiation beam to cure the forming liquid and that is provided such that an incident plane defined by an optical axis of the irradiation beam and the base surface intersects with the ejection surface; and a P-polarizing unit that is provided in the irradiation unit and that adjusts the irradiation beam to match P-polarized beam parallel to the incident plane.

BRIEF DESCRIPTION OF THE DRAWINGS

Exemplary embodiments of the present invention will be described in detail based on the following figures, wherein.

DETAILED DESCRIPTION

Examples of a forming apparatus according to an exemplary embodiment of the invention are described. Arrow X represents an apparatus width direction, arrow Y represents an apparatus depth direction, and arrow Z represents an apparatus height direction. The apparatus width direction (X direction), the apparatus depth direction (Y direction), and the apparatus height direction (Z direction) are orthogonal to one another.

Overall Configuration

An overall configuration of a forming apparatus 10 is described.

Figure 1:
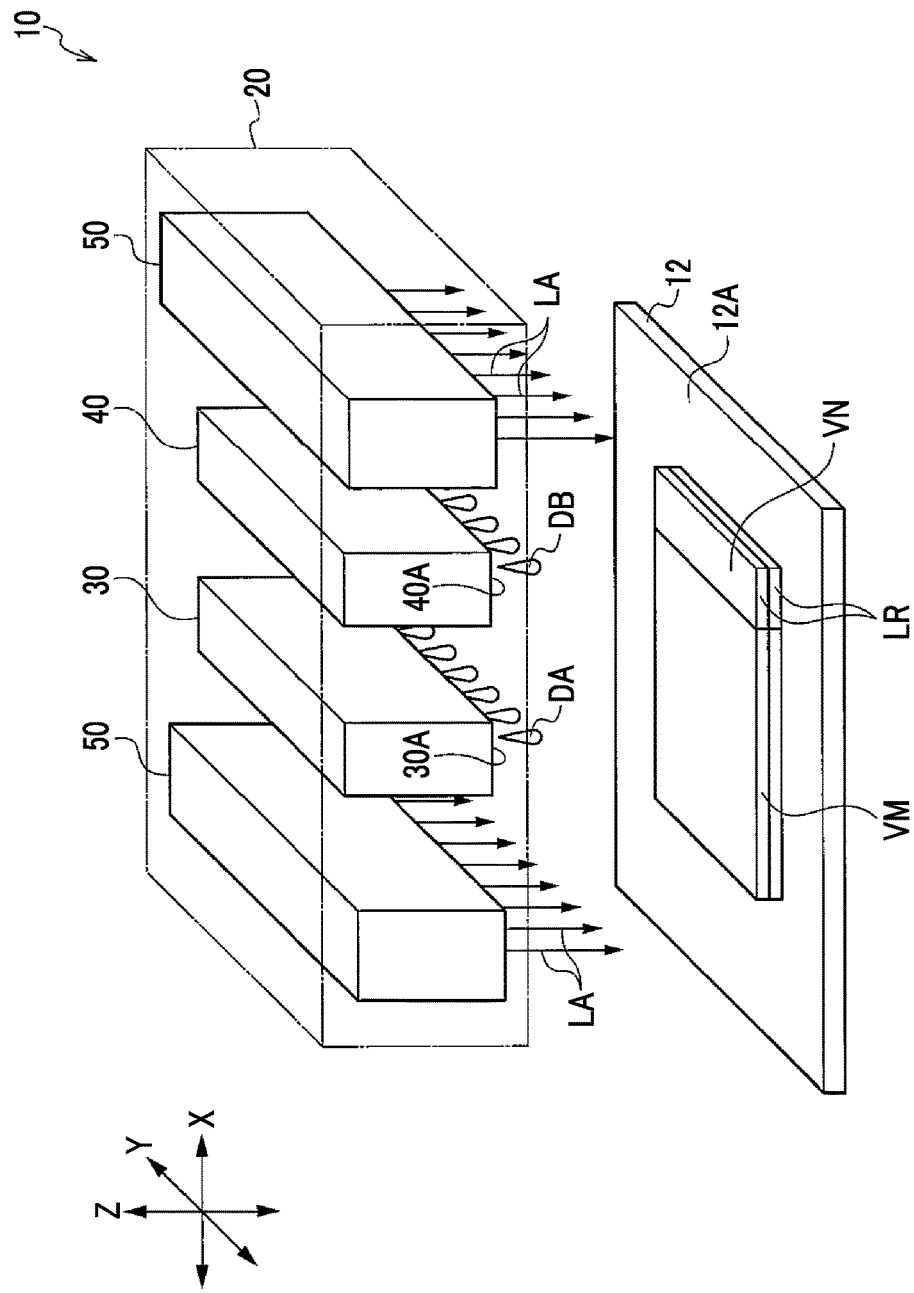
FIG. 1 is a perspective view schematically showing a configuration of a forming apparatus of an exemplary embodiment.
Figure 2:
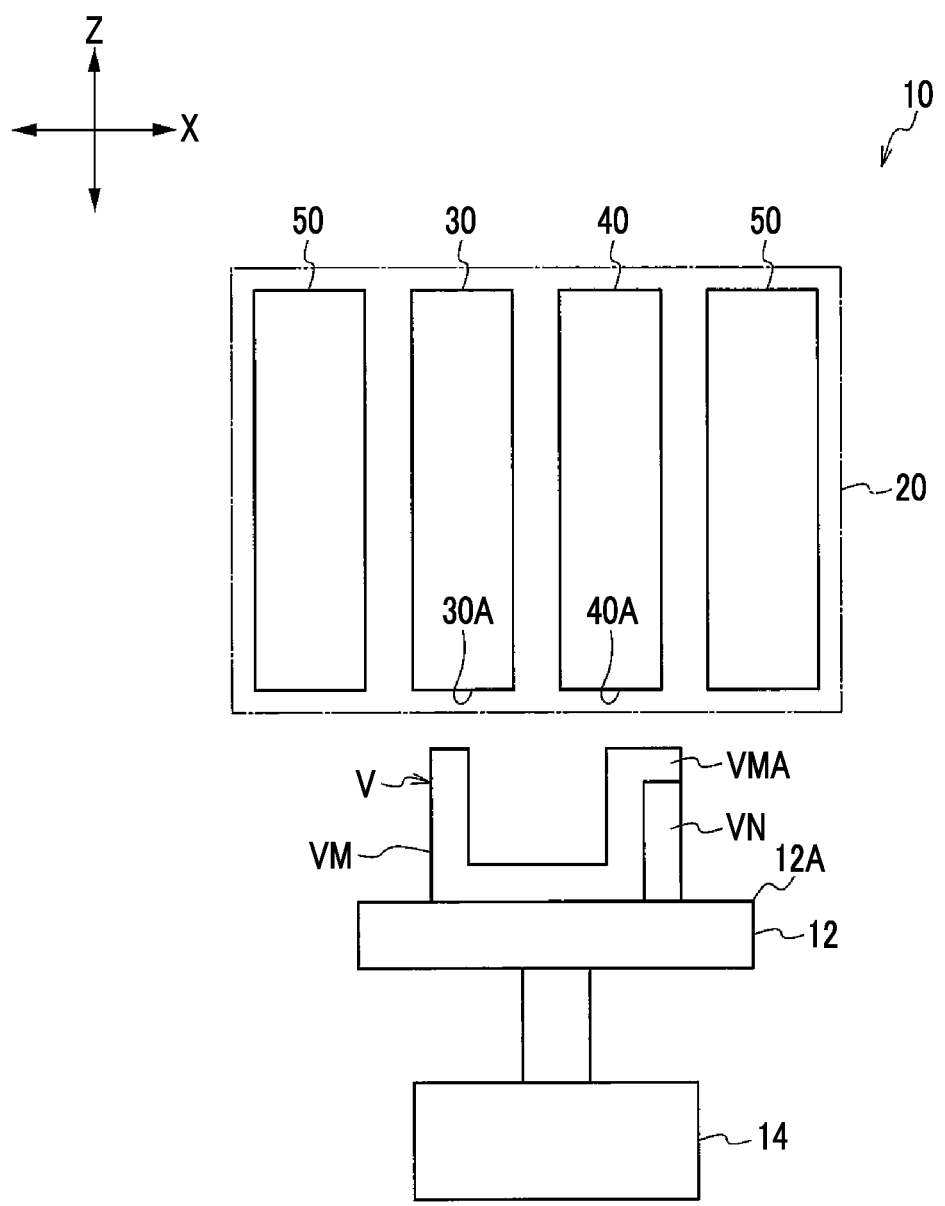
FIG. 2 is a diagram schematically showing main parts of the forming apparatus shown in FIG. 1, when viewed in Y direction.
Figure 3:
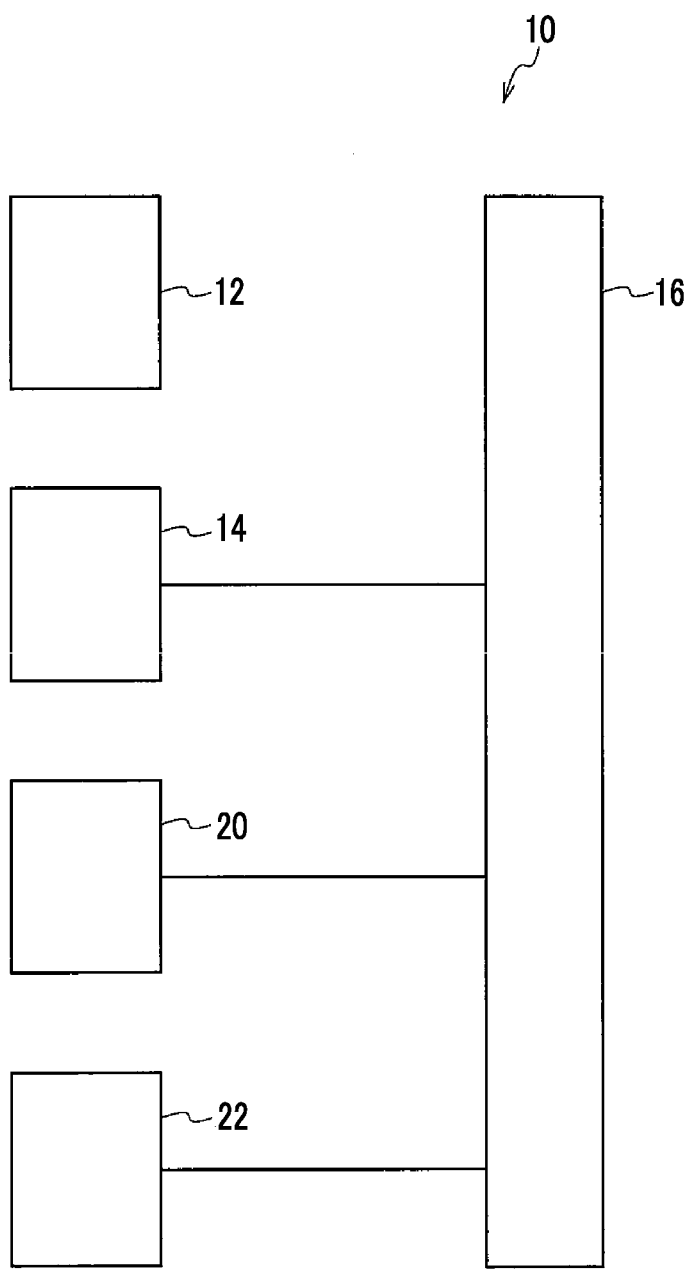
FIG. 3 is a block diagram of a forming apparatus of the exemplary embodiment.

The forming apparatus 10 of the present exemplary embodiment as shown in FIG. 1 a so-called 3D printer in which a droplet DA of a model material and a droplet DB of a support material are ejected, layers LR formed by curing the model material and the support material are stacked, a three-dimensional object V is formed on a forming base plate 12 as shown in FIG. 2, and then, a three-dimensional object VM having a desired shape is formed by removing a support portion VN. In a case where the three-dimensional object VM, to be described below, does not have a portion VMA under which a space is formed, the support portion VN is not formed. As shown in FIG. 3, the forming apparatus 10 is configured to include the forming base plate 12, a drive unit 14, a forming unit 20, a moving unit 22, and a control unit 16.

Forming Base Plate

As shown in FIG. 1 and FIG. 2, the plate-like forming base plate 12 has a top surface which is referred to as a base surface 12A. The three-dimensional object V (refer to FIG. 2) is formed on the base surface 12A.

Drive Unit

The drive unit 14 shown in FIG. 2 and FIG. 3 has a function of causing the forming base plate 12 to move in the apparatus width direction (X direction), the apparatus depth direction (Y direction), and the apparatus height direction (Z direction).

Forming Unit

As shown in FIG. 1 and FIG. 2, the forming unit 20 includes a model material ejecting head 30 as an example of an ejection unit, and a support material ejecting head 40 as an example of an ejection unit, and an irradiation unit 50.

Model Material Ejecting Head and Support Material Ejecting Head

As shown in FIG. 1, the model material ejecting head 30 and the support material ejecting head 40 are long and are disposed to have the longitudinal direction thereof parallel to the apparatus depth direction (Y direction). In addition, the model material ejecting head 30 and the support material ejecting head 40 are disposed to be adjacent in the apparatus width direction.

As shown in FIG. 1 and FIG. 2, the model material ejecting head 30 ejects the droplet DA (refer to FIG. 1) of a model material as an example of a forming liquid for forming the three-dimensional object VM (refer to FIG. 2). In addition, the support material ejecting head 40 ejects the droplet DB of a support material as an example of a forming liquid for forming the support portion VN which supports forming of the three-dimensional object VM that is formed of the model material.

The model material ejecting head 30 and the support material ejecting head 40 according to the present exemplary embodiment have the same configuration except that different forming liquids are ejected, respectively.

Under surfaces of the model material ejecting head 30 and the support material ejecting head 40 toward the base surface 12A of the forming base plate 12 are referred to as an ejection surface 30A and an ejection surface 40A on which multiple nozzles (not shown) are arranged in zigzag lines, respectively, from one end side to the other end side in the longitudinal direction (Y direction). The model material ejecting head 30 and the support material ejecting head 40 are configured to eject the droplet DA and the droplet DB, respectively, from the multiple nozzles.

Here, the model material (droplet DA) and the support material (droplet DB) are examples of a liquid (forming liquid) including a light curing resin. The light curing resin of the present exemplary embodiment is an ultraviolet curing resin having a property to cure by absorbing ultraviolet beams.

Moving Unit

The moving unit 22 (refer to FIG. 3) has a function of causing the forming unit 20 to move. The forming unit 20 is configured to move to a maintenance station (home position) (not shown) by the moving unit 22 after a forming operation and during the forming operation and to perform various maintenance operations such as cleaning to prevent nozzle clogging of the model material ejecting head 30 and the support material ejecting head 40.

Irradiation Unit

As shown in FIG. 1, the irradiation unit 50 is long and is disposed to have the longitudinal direction thereof parallel to the apparatus depth direction (Y direction). In addition, the irradiation units 50 are disposed on both outer sides in the apparatus width direction (X direction) to be adjacent to the model material ejecting head 30 and the support material ejecting head 40, respectively.

The irradiation unit 50 is configured to irradiate the base surface 12A of the forming base plate 12 with an irradiation beam LA from one end side to the other end side in the longitudinal direction (Y direction). The irradiation of the droplet DA and the droplet DB which land by being ejected from the model material ejecting head 30 and the support material ejecting head 40 with the irradiation beam LA is performed and thereby, the droplet DA (model material) and the droplet DB (support material) are cured.

Figure 5:
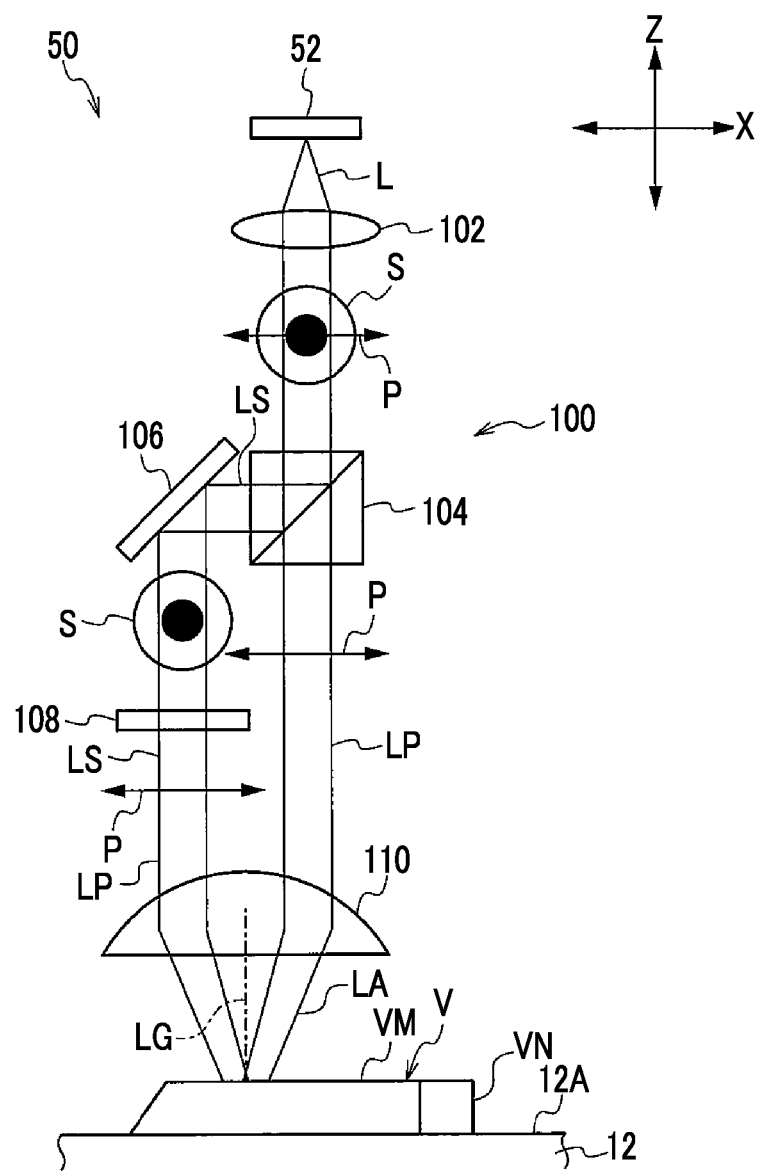
FIG. 5 is a diagram showing a configuration of a P-polarizing section of a first exemplary embodiment, when viewed in Y direction.

As shown in FIG. 5, the irradiation unit 50 is configured to include a beam source 52 that emits an ultraviolet beam L and a P-polarizing section 100 that adjusts the beam to match a P-polarized beam. The beam source 52 is configured of multiple LEDs (not shown) arranged in the apparatus depth direction (Y direction).

Figure 4:
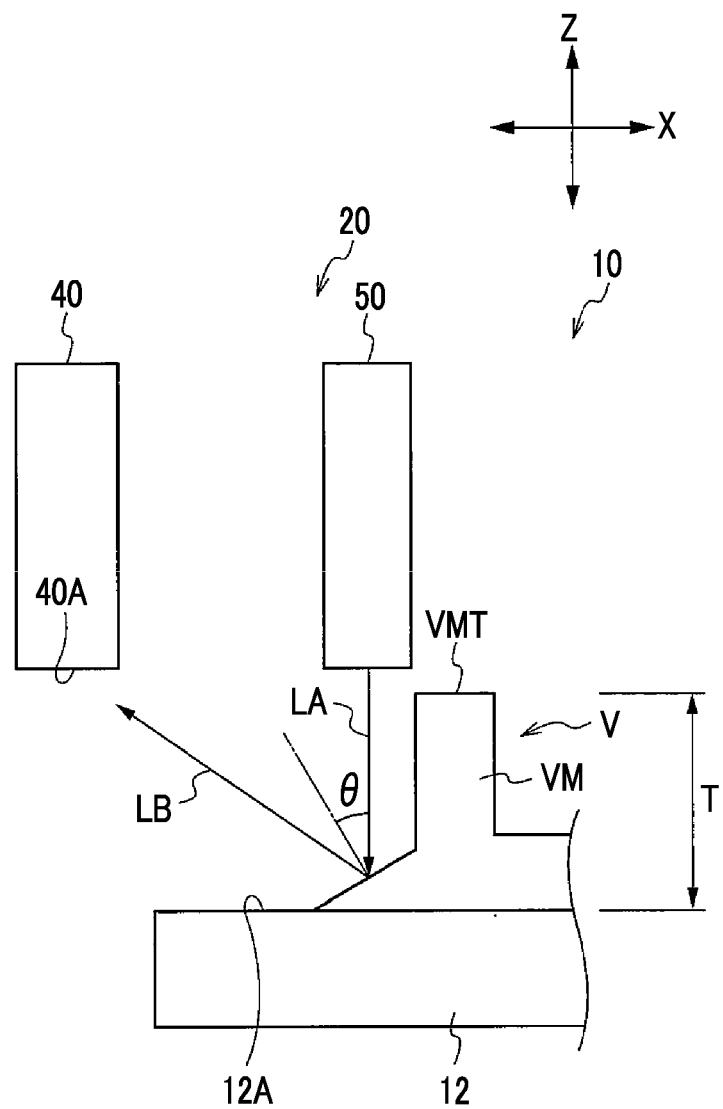
FIG. 4 is a diagram showing reflected beam traveling toward an ejection surface, when viewed in Y direction.

As shown in FIG. 1, FIG. 2, and FIG. 4, the irradiation unit 50 is disposed such that an incident plane (in the present exemplary embodiment, a flat plane including the X direction and the Z direction (a flat plane orthogonal to the Y direction)), which is defined by an optical axis LG (refer to FIG. 5) of an emitted irradiation beam LA and the base surface 12A (boundary surface), intersects with the ejection surface 30A and the ejection surface 40A. The incident plane, the P-polarizing section 100, and the P-polarized beam will be described below.

Control Unit

The control unit 16 has a function of controlling the overall forming apparatus 10. The specific function of the control unit 16 will be described in a forming operation (forming method of a three-dimensional object) of the forming apparatus 10 to be described below.

Forming Method of Three-Dimensional Object

Next, an example of the forming method of the three-dimensional object VM by the forming apparatus 10 of the present exemplary embodiment will be described below.

As shown in FIG. 1 and FIG. 2, the forming apparatus 10 stacks the layers LR which are formed by irradiating and curing the model material and the support material with the irradiation beam LA and forms the three-dimensional object V on the forming base plate 12.

As shown in FIG. 2, the support portion VN is formed of the support material under the portion VMA of the three-dimensional object VM, under which a space is formed, such that the three-dimensional object V is formed while being supported by the support portion VN. Finally, the support portion VN is removed from the three-dimensional object V and a three-dimensional object VM having a desired shape is completely formed.

Hereinafter, the forming method will be described in detail.

First, when the control unit 16 (refer to FIG. 3) receives data from an external apparatus, the control unit 16 converts data (that is, data of three dimensions) of the three-dimensional object VM and the support portion VN (constituting the three-dimensional object V), which is included in the received data into data (that is, data of two dimensions) of multiple layers LR (refer to FIG. 1).

Subsequently, the control unit 16 controls the drive unit 14 such that the forming base plate 12 moves with respect to the forming unit 20 in the apparatus width direction (X direction) and the droplet DA (model material) and the droplet DB (support material) are ejected from the model material ejecting head 30 and the support material ejecting head 40 which constitute the forming unit 20. In addition, the control unit 16 causes the irradiation unit 50 to move in the apparatus width direction (X direction) and to irradiate the droplet DA (model material) and the droplet DB (support material), which have landed, with the irradiation beam LA.

The droplet DA and the droplet DB ejected from the model material ejecting head 30 and the support material ejecting head 40 are cured with the irradiation beam LA immediately after the droplets land on the base surface 12A of the forming base plate 12. In this manner, the first layer LR is formed by scanning in one direction.

Subsequently, the control unit 16 controls the drive unit 14 such that the forming base plate 12 moves to the downstream side in the apparatus height direction (Z direction) by a distance corresponding to a thickness of the layer LR.

The control unit 16 controls the drive unit 14 such that the forming base plate 12 moves with respect to the forming unit 20 in the apparatus width direction, the droplet DA and the droplet DB are ejected from the model material ejecting head 30 and the support material ejecting head 40 which constitute the forming unit 20, the irradiation unit 50 irradiates and cures the droplet DA and the droplet DB, which have landed, with the irradiation beam LA, and the second layer LR is formed.

The ejection of the droplet DA and the droplet DB and the curing of the droplet DA and the droplet DB by the irradiation with the irradiation beam LA are repeated and thereby, the layers LR are stacked on the forming base plate 12 and the three-dimensional object V is formed. Then, As described above, the support portion VN is removed from the three-dimensional object V and the three-dimensional object VM having the desired shape is obtained. In a case where the three-dimensional object VM does not have the portion VMA under which a space is formed, the support portion VN is not formed and thus, the droplet DB is not ejected from the support material ejecting head 40.

P-Polarizing Unit of First Exemplary Embodiment

Next, the P-polarizing section 100 of a first exemplary embodiment which adjusts a beam to match the P-polarized beam will be described below.

Figure 11:
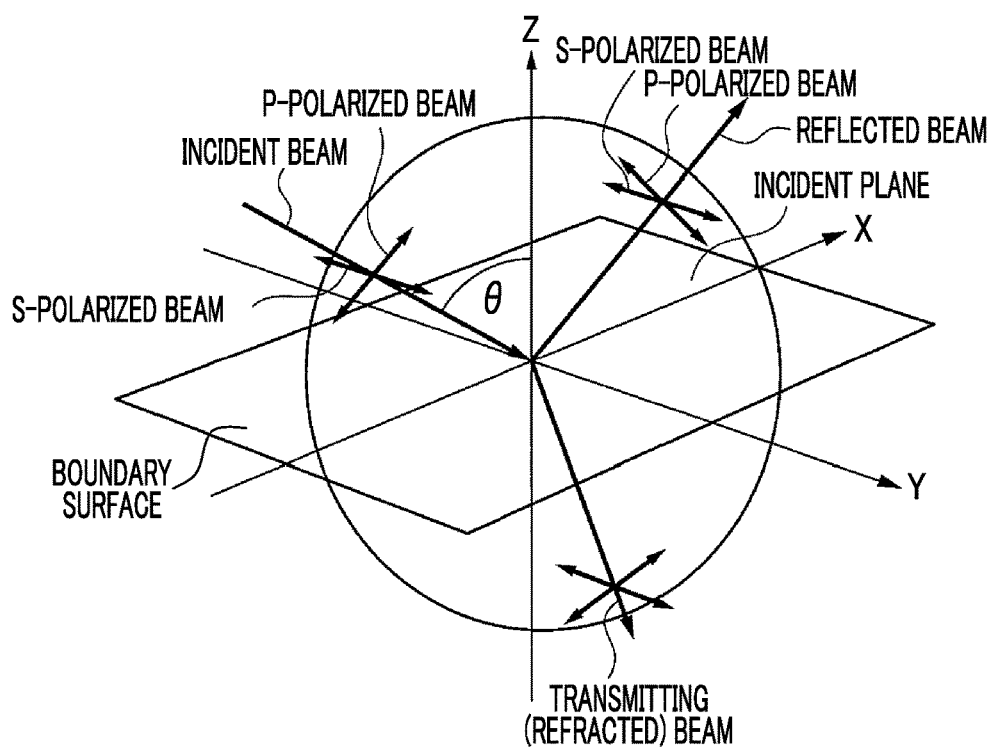
FIG. 11 is a view depicting a relationship between both the P-polarized beam and the S-polarized beam and the incident plane.

Here, as shown in FIG. 11, a plane, which is perpendicular to the boundary surface (reflective surface) and includes incident beam and reflected beam, corresponds to the incident surface, a polarized beam having an electric field which vibrates in parallel with the incident surface corresponds to the P-polarized beam, and a polarized beam having an electric field which vibrates perpendicularly to the incident surface corresponds to the S-polarized beam. The P-polarizing section 100 has a function of adjusting the beam to match the P-polarized beam, as the irradiation beam LA.

In the present exemplary embodiment, the incident beam corresponds to the irradiation beam LA and the boundary surface corresponds to the base surface 12A or a surface of the three-dimensional object V from which the irradiation beam LA is reflected. In addition, the reference LB is assigned to the reflected beam. An additional description of the incident plane will be provided below.

In addition, as described above, the incident plane of the present exemplary embodiment is a flat plane defined by an optical axis LG of the irradiation beam LA and the base surface 12A and a plane including the X direction and the Z direction (a flat plane orthogonal to the Y direction). In FIG. 2, FIG. 4, and FIG. 5, a surface parallel to the paper surface corresponds to the incident plane. In addition, a signal P in FIG. 5 indicates vibration of an electric field parallel to the incident plane (paper surface) and a signal S indicates vibration of an electric field perpendicular to the incident plane (paper surface).

As shown in FIG. 5, the P-polarizing section 100 is configured to include a first lens 102, a polarizing beam splitter (PBS) 104 as an example of a separation unit, a reflective mirror 106, a half-wave plate 108 as an example of a conversion unit, and a second lens 110 as an example of an optical source.

The first lens 102 is disposed on the downstream side in the irradiation direction of the beam source 52 and has a function of converting the ultraviolet beam L emitted from the beam source 52 into parallel light.

The polarizing beam splitter 104 is disposed on the downstream side of the first lens 102 in the irradiation direction, performs separation into the S-polarized beam and the P-polarized beam, emits a beam flux LS of the separated S-polarized beam in the apparatus width direction (X direction), and emits the beam flux LP of the separated P-polarized beam on the downstream side in the irradiation direction in the apparatus height direction. The beam flux LP of the separated P-polarized beam is emitted toward the second lens 110 and the beam flux LS of the separated S-polarized beam is emitted toward the reflective mirror 106.

The beam flux LS of the S-polarized beam is reflected from the reflective mirror 106 toward the half-wave plate 108 disposed on the downstream side in the irradiation in the apparatus height direction.

The half-wave plate 108 converts the beam flux LS of the S-polarized beam into the beam flux LP of the P-polarized beam by rotating a polarization plane by 90° and emits the beam flux LP toward the second lens 110.

The second lens 110 causes two of beam flux LP of the P-polarized beam and the beam flux LS of the S-polarized beam to be focused in the apparatus width direction, respectively, and performs irradiation of the three-dimensional object V.

Operations

Next, operations of the present exemplary embodiment will be described below.

As described above, the forming apparatus 10 of the present exemplary embodiment repeats the ejection of the droplet DA and the droplet DB and the curing of the droplet DA and the droplet DB by irradiation, thereby, the three-dimensional object V is formed by stacking the layers LR on the forming base plate 12, the support portion VN is removed, and then the three-dimensional object VM having desired shape is formed.

As shown in FIG. 4, the irradiation beam LA, with which the droplet DA and the droplet DB are cured, is reflected from the forming base plate 12 or the three-dimensional object V. When the ejection surface 30A (refer to FIG. 2) of the model material ejecting head 30 and the ejection surface 40A of the support material ejecting head 40 are irradiated with the reflected beam (stray light) LB, there is concern that the model material and the support material are cured, which results in a problem such as nozzle clogging in a case where the P-polarizing section 100 is not provided.

However, as shown in FIG. 5, in the irradiation unit 50 of the present exemplary embodiment, the P-polarizing section 100 adjusts a beam L from the beam source 52 to match the P-polarized beam (beam flux LP) and irradiation is performed. The P-polarized beam has low reflectance lower than that of another beam (an S-polarized beam or an unpolarized beam).

In addition, in the configuration, the ejection surface 30A of the model material ejecting head 30 and the ejection surface 40A of the support material ejecting head 40 intersect with each other on the incident plane defined by the optical axis LG of the irradiation beam LA and the base surface 12A.

Accordingly, an amount of the reflected beam LB reflected to the ejection surface 30A of the model material ejecting head 30 and the ejection surface 40A of the support material ejecting head 40 is reduced, the curing of the model material and the support material is controlled, and as a result, the problem such as the nozzle clogging due to the curing of the model material and the support material is prevented or suppressed.

In addition, in the present exemplary embodiment, the ultraviolet beam L is separated into the P-polarized beam and the S-polarized beam and the S-polarized beam is converted into the P-polarized beam by causing the polarization plane to rotate by 90° using the half-wave plate 108. Accordingly, the amount of the irradiation beam LA is suppressed not to be reduced in comparison to a case in which, for example, the polarization is performed using a polarization lens (polarization filter). In other words, the amount of the P-polarized beam, with which irradiation is performed, becomes greater in comparison to a case in which the polarization is performed using the polarization lens (polarization filter).

Reflectance of P-Polarized Beam

Next, description of reflectance of the P-polarized beam, which is lower than other beams, will be provided below. The low reflectance of the P-polarized beam is known for those who skilled in the technical art and thus, will be briefly described. In addition, a detailed description is written on pp. 348 of the following book:

Title of Book: Optics, Fourth Edition;
Writer: Eugene Hecht;
Publisher: Addison Wesley;
Year of Publication: 2002

As shown in FIG. 11, when the incident beam (irradiation beam LA in the present exemplary embodiment) comes into contact with the boundary surface (in the present exemplary embodiment, the base surface 12A of the forming base plate 12 or the like) of an object, electrons of the object vibrate in a direction of a beam (electric field). The vibration of the electrons produces the reflected beam (in the present exemplary embodiment, reflected beam LB) and refracted beam. At this time, the maximum amplitude of the produced reflected beam of the electrons is found in the emission in the perpendicular direction to the vibration direction of the electrons. Meanwhile, the maximum amplitude is not found in emission in a direction parallel to the vibration direction of the electron.

The P-polarized beam parallel to the incident plane has an angle formed between a traveling direction of the reflected beam and the vibration direction of the electron so as to have low reflectance. Particularly, when the angle formed between the traveling direction of the reflected beam and the vibration direction of the electron is 0° (when a sum of the incident angle and the refracting angle is 90° and a sum of the reflecting angle and the refracting angle is 90°), no reflected beam of the P-polarized beam is produced. When no reflected beam of the P-polarized beam is produced such that the angle therebetween is 0°, an incident angle θB is referred to as a Brewster's angle.

Figure 9:
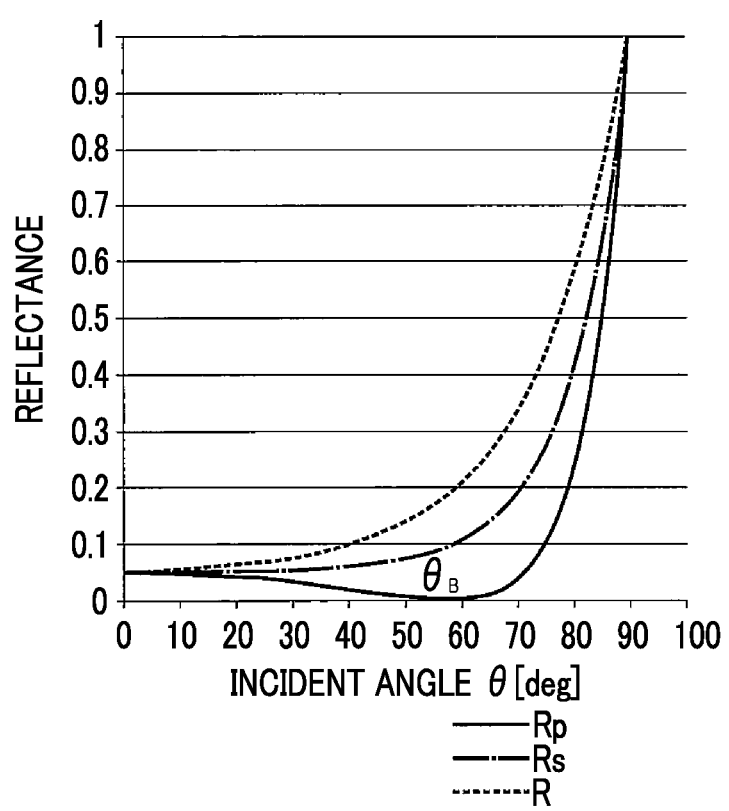
FIG. 9 is a graph showing a relationship between an incident angle and reflectance of a P-polarized beam, an S-polarized beam, and an unpolarized beam.

The graph in FIG. 9 shows a relationship between an incident angle θ (angle formed between the boundary surface and the incident beam) and reflectance in each case of the P-polarized beam, the S-polarized beam, and unpolarized beam. Solid line Rp represents the P-polarized beam, dot and dash line Rs represents the S-polarized beam, and dotted line R represents the unpolarized beam.

As understood in the graph, the P-polarized beam has lower reflectance in any incident angle θ than both the S-polarized beam and unpolarized beam. The reflectance of the P-polarized beam is monotonically decreased to θB (Brewster's angle). Meanwhile the reflectance of the S-polarized beam is monotonically increased. In FIG. 9, a known graph is shown.

Regarding Height of Three-Dimensional Object

The forming apparatus 10 of the present exemplary embodiment is a so-called 3D printer that forms the three-dimensional object V (three-dimensional object VM) on the forming base plate 12. Accordingly, as shown in FIG. 4, a height T of the three-dimensional object V from the base surface 12A to a top portion VMT thereof becomes greater as the three-dimensional object V is formed. In addition, as the height T of the three-dimensional object V from the base surface 12A becomes greater (as the three-dimensional object V (three-dimensional object VM) is formed), a distance between both the ejection surface 30A of the model material ejecting head 30 and the ejection surface 40A of the support material ejecting head 40, and the base surface 12A becomes greater such that the incident angle θ of the irradiation beam LA which is reflected toward the ejection surface 30A of the model material ejecting head 30 and the ejection surface 40A of the support material ejecting head 40.

P-Polarizing Unit of Second Exemplary Embodiment

Next, a P-polarizing section 120 of a second exemplary embodiment will be described with reference to FIG. 6. The same reference sign is assigned to the same member as in the P-polarizing section 100 of the first exemplary embodiment and a repetitive description thereof is omitted.

Figure 6:
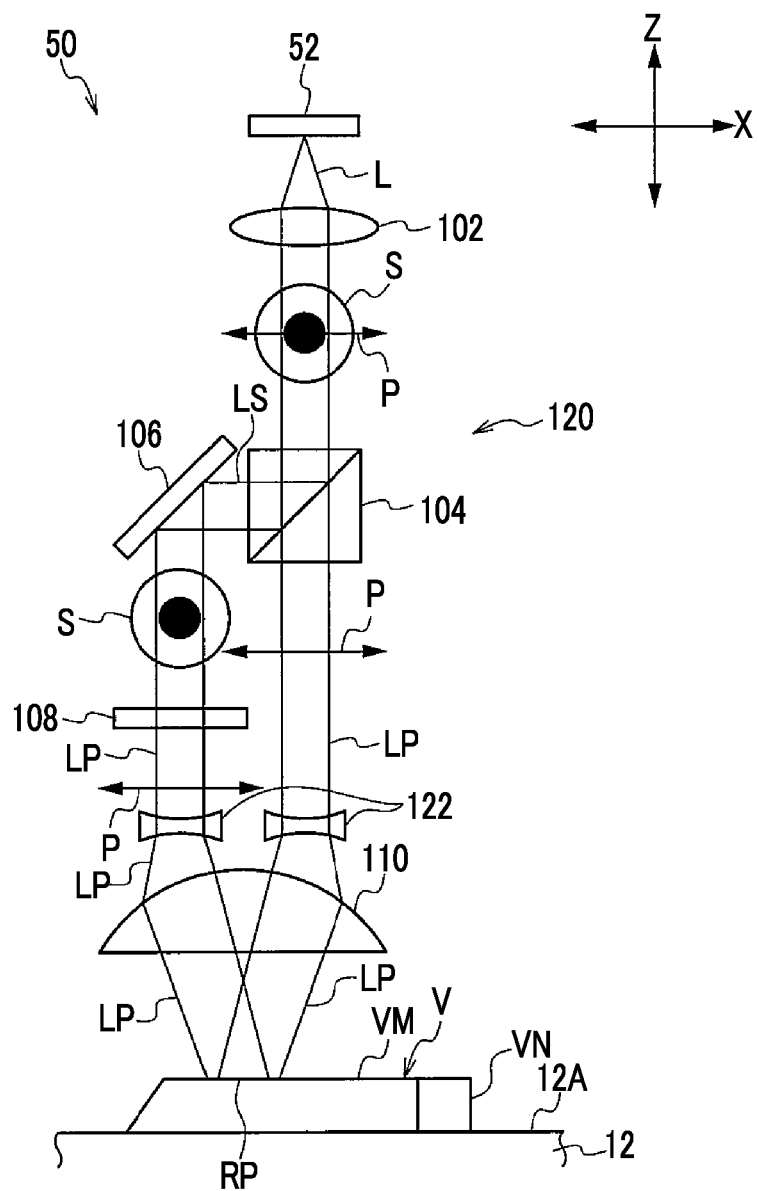
FIG. 6 is a diagram showing a configuration of a P-polarizing section of a second exemplary embodiment, when viewed in Y direction.

As shown in FIG. 6, the P-polarizing section 120 includes third lenses 122 which are disposed between the polarizing beam splitter 104 and the second lens 110 and between the half-wave plate 108 and the second lens 110, respectively, and which convert the beam fluxes LP of the P-polarized beams into divergent beam.

Operations

Next, operations of the present exemplary embodiment will be described.

The third lenses 122 convert the beam flux LP of the P-polarized beam incident to the second lens 110 into the divergent beam and thereby, it is possible to control both a size of a beam concentrated spot RP as a region in which the two beam fluxes LP of the two P-polarized beams are overlapped with each other in the X direction and an irradiation range in the X direction.

P-Polarizing Unit of Third Exemplary Embodiment

Next, a P-polarizing section 200 of a third exemplary embodiment will be described with reference to FIG. 7. The same reference sign is assigned to the same member as in the P-polarizing section 100 of the first exemplary embodiment or the P-polarizing section 120 of the second exemplary embodiment and a repetitive description thereof is omitted.

In FIG. 4 showing the P-polarizing section 100 of the first exemplary embodiment and FIG. 6 showing the P-polarizing section 120 of the second exemplary embodiment, planes parallel to the paper surface is shown as the incident plane. However, in FIG. 7 showing the P-polarizing section 200 of the third exemplary embodiment, a plane perpendicular to the paper surface is shown as the incident plane (refer to arrow Y in FIG. 7). Accordingly, a reference sign P in FIG. 6 represents vibration of an electric field parallel (in FIG. 6, perpendicular) to the incident plane and a reference sign S in FIG. 6 represents vibration of an electric field perpendicular (in FIG. 6, parallel) to the incident plane.

Figure 7:
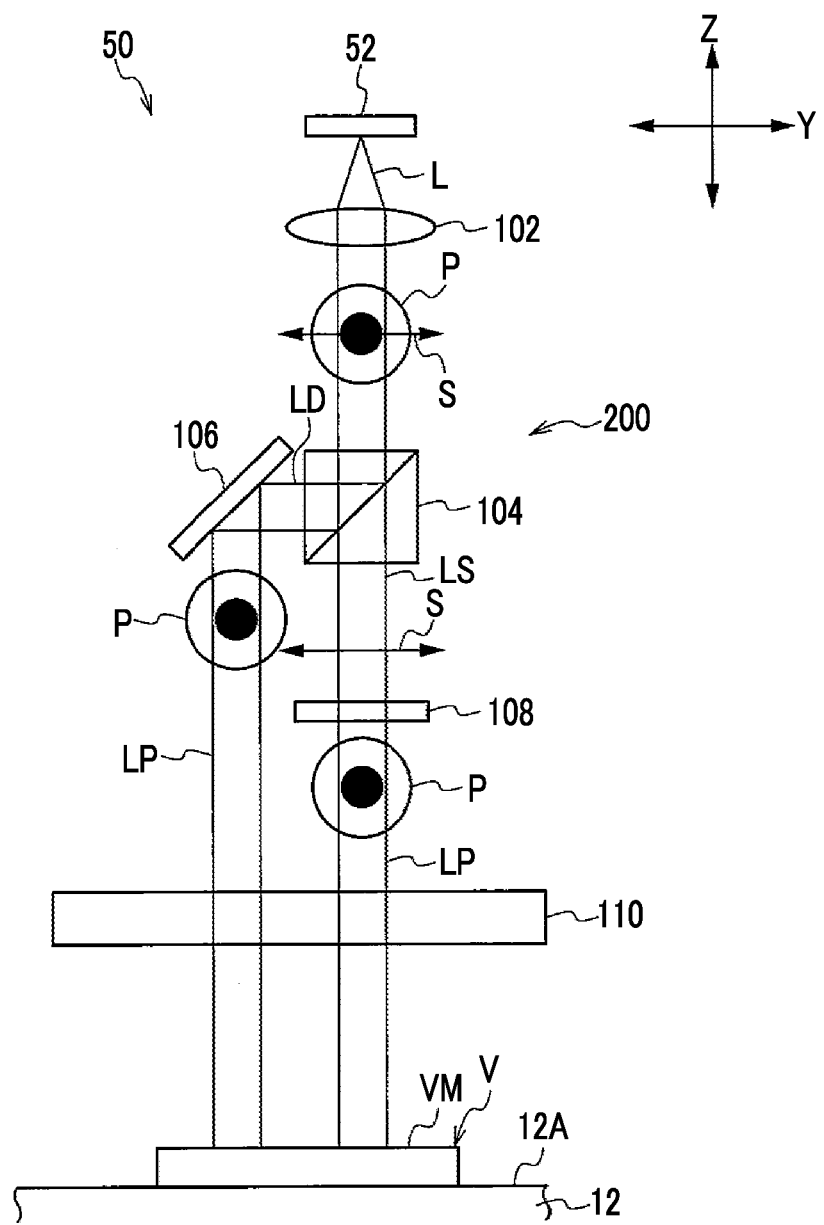
FIG. 7 is a diagram showing a configuration of a P-polarizing section of a third exemplary embodiment, when viewed in Y direction.

As shown in FIG. 7, the polarizing beam splitter 104 separates the ultraviolet beam L into the S-polarized beam and the P-polarized beam, the beam flux LP of the separated P-polarized beam is emitted in the apparatus depth direction (Y direction), and the beam flux LS of the separated S-polarized beam is emitted on the downstream side in the irradiation direction in the apparatus height direction.

The beam flux LP of the P-polarized beam separated and emitted in the apparatus width direction (X direction) is incident to the reflective mirror 106. The reflective mirror 106 causes the beam flux LP of the P-polarized beam to be reflected toward the second lens 110 disposed on the downstream side in the irradiation direction in the apparatus height direction.

Meanwhile, The beam flux LS of the separated S-polarized beam is converted into the beam flux LP of the P-polarized beam by causing the polarization plane to rotate by 90° using the half-wave plate 108 and is emitted toward the second lens 110.

Operations

Next, operations of the present exemplary embodiment will be described.

The polarizing beam splitter 104 causes the beam flux LP of the separated P-polarized beam to be emitted in the apparatus depth direction (Y direction) and thus, a broad range in the Y direction corresponding to an arrangement direction of the LEDs which constitute the beam source 52 is irradiated. In addition, when the amount of beam of each of the LEDs which constitute the beam source 52 becomes greater, it is possible to decrease the number of LEDs.

P-Polarizing Unit of Fourth Exemplary Embodiment

Next, a P-polarizing section 220 of a fourth exemplary embodiment will be described with reference to FIG. 8. The same reference sign is assigned to the same member as in the P-polarizing section 100 of the first exemplary embodiment, the P-polarizing section 120 of the second exemplary embodiment, or the P-polarizing section 200 of the third exemplary embodiment, and a repetitive description thereof is omitted.

Figure 8:
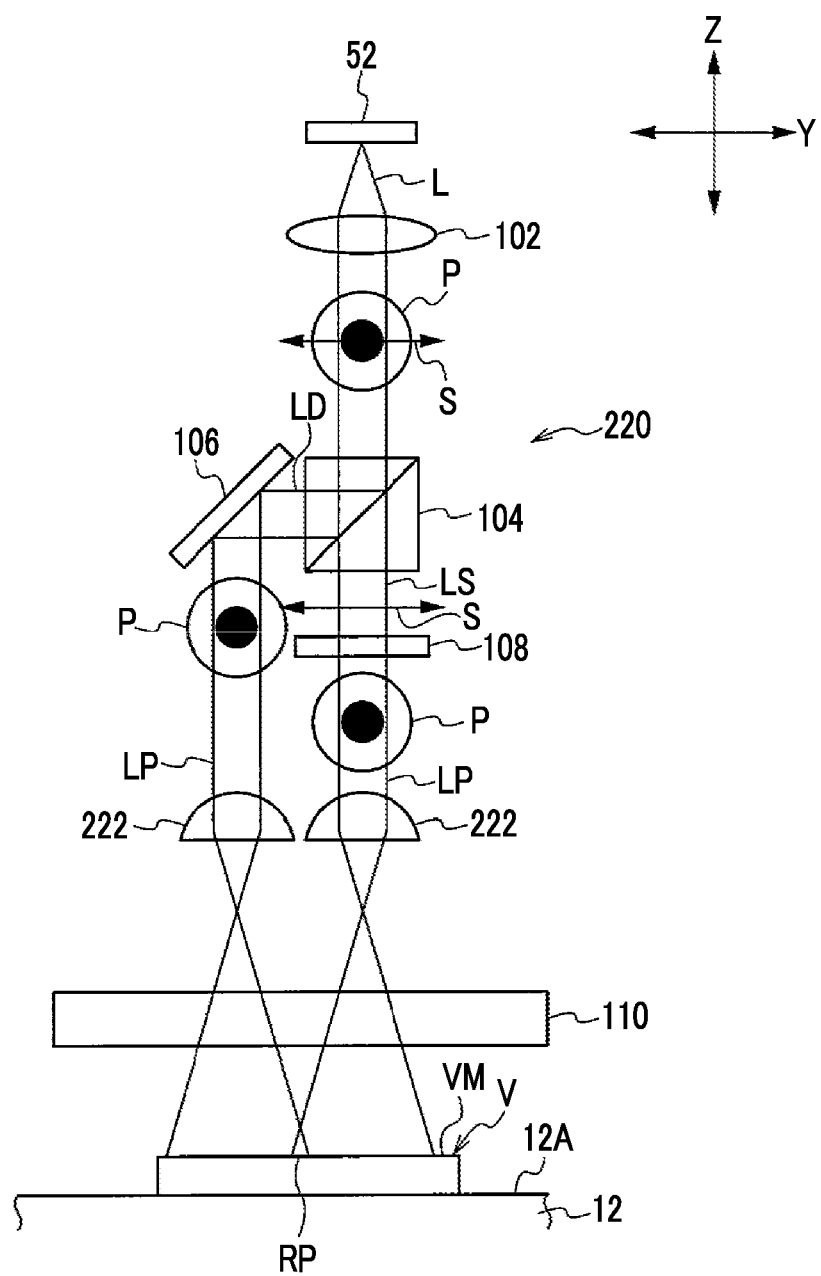
FIG. 8 is a diagram showing a configuration of a P-polarizing section of a fourth exemplary embodiment, when viewed in Y direction.

In addition, similar to FIG. 7 showing the P-polarizing section 200 of the third exemplary embodiment, in FIG. 8 showing the P-polarizing section 220 of the present exemplary embodiment, a plane perpendicular to the drawing is shown as the incident plane (refer to arrow Y in FIG. 8).

As shown in FIG. 8, the P-polarizing section 220 includes fourth lenses 222 which have power in the Y direction to cause the beam fluxes LP of the P-polarized beams to be focused between both the polarizing beam splitter 104 and the half-wave plate 108 and the second lens 110, respectively.

Operations

Next, operations of the present exemplary embodiment will be described.

The fourth lenses 222 cause the beam fluxes LP of the P-polarized beams incident to the second lens 110 to be focused both between both the polarizing beam splitter 104 and the half-wave plate 108 and the second lens 110, and thereby, it is possible to control both the size of the beam concentrated spot RP as a region in which the two beam fluxes LP of the two P-polarized beams are overlapped with each other in the Y direction and the irradiation range in the X direction.

P-Polarizing Unit of Another Exemplary Embodiment

The P-polarizing section that adjusts the ultraviolet beam L to match the P-polarized beam is not limited to the structure of the exemplary embodiment described above. The P-polarizing section may have a structure in which the structures of the multiple exemplary embodiments are appropriately combined. In addition, although the amount of beam is decreased, a polarizing lens (polarizing filter), through which polarization to the P-polarized beam is performed, may be used. For example, a structure may be employed, in which the polarizing lens (polarizing filter) is disposed between the beam source 52 and the base surface 12A.

Additional Description of Incident Plane

The incident plane is additionally described.

Specifically, the incident plane in the case in which the incident angle θ of the incident beam with respect to the boundary surface (reflective surface) is 0°, that is, the case in which, in the present exemplary embodiment, an optical axis L of the irradiation beam LA is parallel to an Z axis (case in which the optical axis LG has an angle of 0° with respect to the Z axis) is described.

Figure 10:
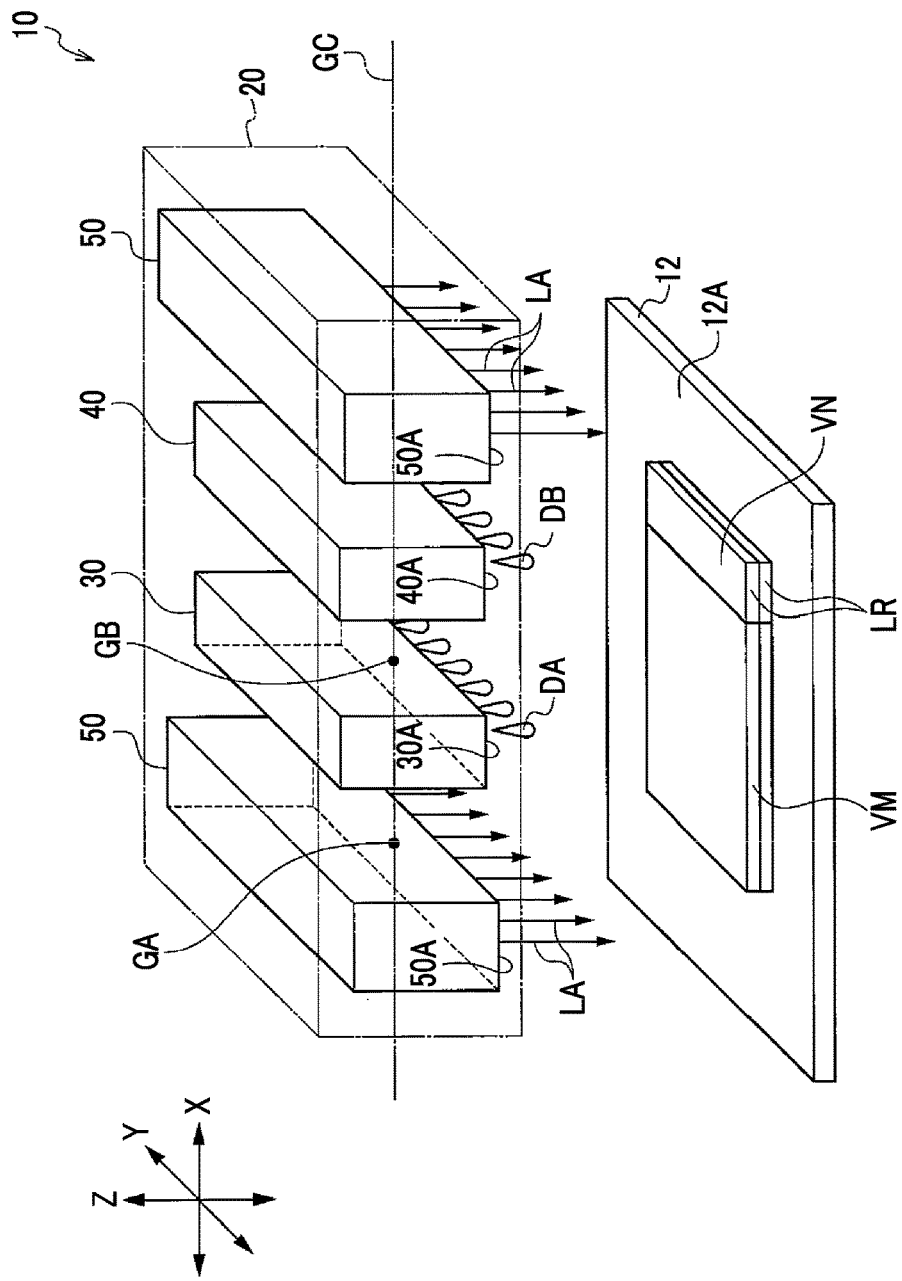
FIG. 10 is a view depicting an incident plane in a case where an incident angle θ of an incident beam is 0°.

As shown in FIG. 10, in such a case, a plane configured of a straight line GC passing through the center GA of an emission surface 50A of the irradiation unit 50 and the center GB of the ejection surface 30A and the optical axis L (refer to FIG. 5) passing through the center GA of the emission surface 50A of the irradiation unit 50 corresponds to the incident plane.

As above, the ejection surface 30A of the model material ejecting head 30 is described and the same is true for the ejection surface 40A of the support material ejecting head 40. In addition, the irradiation unit 50 on the left in the drawings is described and the same is true for the irradiation unit 50 on the right in the drawings.

Other Exemplary Embodiments

An exemplary embodiment of the invention is not limited to the exemplary embodiments described above.

For example, in the exemplary embodiments described above, the model material and the support material is the ultraviolet light curing type forming liquid which is cured by being irradiated with the ultraviolet beam; however, the materials do not limited thereto. The forming liquid may be cured by being irradiated with a beam other than the ultraviolet beam. The beam source 52 which emits a beam corresponding to the forming liquid may be appropriately selected.

For example, in the present exemplary embodiment described above, the forming base plate 12 moves in the X direction, the Y direction, and the Z direction and the three-dimensional object V (three-dimensional object VM) is formed; however, the forming of the three-dimensional object V is not limited thereto. The forming unit 20 may move in the X direction, the Y direction, and the Z direction, and the three-dimensional object V may be formed. Alternatively, the forming unit 20 may move in the X direction and the Y direction, and the forming base plate 12 may move in the Z direction. In short, in a structure, the forming base plate 12 and the model material ejecting head 30 and the support material ejecting head 40 which constitute the forming unit 20 may move relatively to one another in the X direction, the Y direction, and the Z direction.

In addition, the forming apparatus 10 is not limited to the configuration of the exemplary embodiments described above but may have various configurations. For example, the forming apparatus 10 of the exemplary embodiment described above is a so-called 3D printer which forms the three-dimensional object VM (three-dimensional object V); however, the forming apparatus 10 is not limited thereto. For example, the exemplary embodiment of the invention may be applied to a so-called ink jet printer which causes a droplet of a forming liquid to land on a recording medium or the like, causes the droplet which has landed to be irradiated and cured, and forms an image.

In addition, in the exemplary embodiment described above, two irradiation units 50 are provided; however, the number of the irradiation units 50 is not limited thereto. One or three or more irradiation units 50 may be provided. In addition, in the exemplary embodiment described above, two ejection units of the model material ejecting head 30 and the support material ejecting head 40 are provided; however, one or three or more ejection units may be provided depending on an apparatus structure.

Further, it is needless to say that the invention may be embodied in various ways within a scope which does not depart from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A forming apparatus comprising:
an ejection unit comprising an ejection surface configured to eject a droplet of a forming liquid toward a base surface of a forming base plate and to move relatively to the forming base plate;
an irradiation unit configured to irradiate the forming liquid ejected on the forming base plate with an irradiation beam and to cure the forming liquid and that is provided such that an incident plane defined by an optical axis of the irradiation beam and the base surface intersects with the ejection surface; and
a P-polarizing unit of the irradiation unit configured to adjust the irradiation beam to match a P-polarized beam parallel to the incident plane,
wherein the P-polarizing unit comprises a polarizing beam splitter which is configured to split the irradiation beam into an S-polarized beam and the P-polarized beam such that the S-polarized beam is emitted from the polarizing beam splitter in a first direction perpendicular to the P-polarized beam and perpendicular to the optical axis of the irradiation beam,
wherein P-polarizing unit further comprises a mirror configured to reflect the S-polarized beam, emitted from the polarizing beam splitter, in a second direction parallel to the optical axis and parallel to a direction in which P-polarized beam is emitted from the polarizing beam splitter,
wherein the mirror is further configured to reflect the S-polarized beam to a conversion unit of the P-polarizing unit in the second direction, the conversion unit configured to convert the S-polarized beam into a second P-polarized beam and to emit the second P-polarized beam in the second direction parallel to the P-polarized beam and the optical axis, and
wherein the optical axis extends in a shortest distance from a portion of the irradiation unit, configured to emit the irradiation beam, to the base surface.

2. The forming apparatus according to claim 1,
wherein the P-polarizing unit includes:
a separation unit configured to separate the irradiation beam into the P-polarized beam and an S-polarized beam; and
a conversion unit that converts the S-polarized beam separated by the separation unit into a second P-polarized beam by rotating a plane of the S-polarized beam.

3. The forming apparatus according to claim 2,
wherein the P-polarizing unit includes optical elements configured to diverge or focus a plurality of P-polarized beams, including the P-polarized beam, and are provided on a downstream side of the separation unit and a downstream side of the conversion unit in an irradiation direction.

4. The forming apparatus according to claim 1,
wherein the ejection unit and the irradiation unit are further configured to form a three-dimensional object on the forming base plate by stacking layers, of forming liquid ejected from the ejection unit, and formed by curing the forming liquid by the irradiation unit.

5. The forming apparatus according to claim 2,
wherein the ejection unit and the irradiation unit are further configured to form a three-dimensional object on the forming base plate by stacking layers, of forming liquid ejected from the ejection unit, and formed by curing the forming liquid by the irradiation unit.

6. The forming apparatus according to claim 3,
wherein the ejection unit and the irradiation unit are further configured to form a three-dimensional object on the forming base plate by stacking layers, of forming liquid ejected from the ejection unit, and formed by curing the forming liquid by the irradiation unit.

7. The forming apparatus according to claim 1, further comprising:
a lens downstream of the P-polarizing unit in a direction towards the base surface,
wherein the P-polarizing unit is further configured to:
separate the irradiation beam into an S-polarized beam and the P-polarized beam,
convert the S-polarized beam into a second P-polarized beam, and
transmit the second P-polarized beam to the lens.

8. The forming apparatus according to claim 7, wherein the lens is configured to focus both the P-polarized beam and the second P-polarized beam toward the base surface.

9. The forming apparatus according to claim 7, further comprising:
a first divergent lens configured to diverge the P polarized beam towards the lens after separation of the S-polarized beam from the P-polarized beam; and
a second divergent lens configured to diverge the second P-polarized beam towards the lens,
wherein the lens is configured to focus both the P-polarized beam and the second P-polarized beam toward the base surface.

10. The forming apparatus according to claim 7, wherein the P-polarizing unit and the lens are configured such that the P-polarized beam and the second P-polarized beam do not converge in the direction towards base plate.

11. The forming apparatus according to claim 7, further comprising:
a second lens downstream of the P-polarizing unit in a direction towards the base surface,
wherein the lens is a first lens,
the first lens is configured to focus the P-polarized beam towards the base surface such that a first focal point of the P-polarized beam is between the first lens and the base surface in the direction,
the second lens is configured to focus the second P-polarized beam towards the base surface such that a second focal point of the second P-polarized beam is between the first lens and the base surface in the direction, and
wherein the first lens is further configured to transmit the P-polarized beam and the second lens is further configured to transmit the second P-polarized beam such that the first focal point and the second focal point do not converge with each other and such that the P-polarized beam converges with the second P-polarized beam is the direction towards the base surface.

12. The forming apparatus according to claim 1, further comprising:
a second irradiation unit configured to irradiate the forming liquid ejected on the forming base plate with a second irradiation beam and to cure the forming liquid and that is provided such that the incident plane defined by the optical axis of the irradiation beam and the base surface intersects with the ejection surface,
wherein the ejection unit is configured to move in a second direction which is perpendicular to both of a direction in which the irradiation beam is emitted from the irradiation unit and is perpendicular to a longitudinal direction of the irradiation unit, wherein the irradiation unit is a first irradiation unit,
wherein the first irradiation unit is disposed on a first side of the ejection unit in the second direction, and
the second irradiation unit is disposed on a second side of the ejection unit opposite to the first side in the second direction.

13. The forming apparatus according to claim 12, wherein the longitudinal direction of the first irradiation unit extends is perpendicular to the direction in which the irradiation beam is emitted from the first irradiation unit,
wherein a plurality of first light emitting portions are arranged along the first irradiation unit in the longitudinal direction, and
wherein a plurality of second light emitting portions are arranged along the second irradiation unit in the longitudinal direction.

* * * * *